United States Patent [19]

Degen

[11] Patent Number: 4,959,150

[45] Date of Patent: Sep. 25, 1990

[54] FLUID TREATMENT SYSTEM HAVING LOW AFFINITY FOR PROTEINACEOUS MATERIALS

[75] Inventor: Peter J. Degen, Huntington, N.Y.

[73] Assignee: Pall Corporation, Glen Cove, N.Y.

[21] Appl. No.: 249,321

[22] Filed: Sep. 26, 1988

[51] Int. Cl.[5] .............................................. B01D 69/02
[52] U.S. Cl. ..................... 210/638; 210/651;
       210/490; 210/500.24; 210/500.35; 427/245
[58] Field of Search ............... 210/500.24, 500.35, 210/638, 651, 639, 490; 427/245

[56] References Cited

U.S. PATENT DOCUMENTS

| | | | |
|---|---|---|---|
| 3,083,118 | 3/1963 | Bridgeford | 117/47 |
| 3,524,546 | 10/1967 | Hoehn et al. | 210/23 |
| 3,566,874 | 3/1971 | Shepherd et al. | 128/349 |
| 3,695,921 | 10/1972 | Shepherd et al. | 117/72 |
| 3,728,290 | 4/1973 | Johansson et al. | 260/2.5 |
| 3,861,396 | 1/1975 | Vaillancourt et al. | 128/350 |
| 3,944,485 | 3/1976 | Rembaum et al. | 210/638 |
| 4,055,682 | 10/1977 | Merrill | 427/2 |
| 4,256,782 | 3/1981 | Tazuke et al. | 427/53.1 |
| 4,268,463 | 5/1981 | Aoyagi et al. | 210/500.35 X |
| 4,329,383 | 5/1982 | Joh | 210/500.24 X |
| 4,346,142 | 8/1982 | Lazear | 428/315 |
| 4,459,210 | 7/1984 | Murakami et al. | 210/500.35 X |
| 4,459,318 | 7/1984 | Hyans | 427/36 |
| 4,473,474 | 9/1984 | Ostreicher et al. | 210/636 |
| 4,473,475 | 9/1984 | Barnes, Jr. et al. | 210/638 |
| 4,526,579 | 7/1985 | Ainpour | 604/265 |
| 4,527,293 | 7/1985 | Eckstein et al. | 623/12 |
| 4,604,208 | 8/1986 | Chu et al. | 210/636 |
| 4,618,533 | 10/1986 | Steuck | 427/245 X |
| 4,619,767 | 10/1986 | Kamiyama et al. | 210/490 |
| 4,634,604 | 1/1987 | Tlustakova et al. | 427/213.33 |
| 4,673,504 | 7/1987 | Ostreicher et al. | 210/500.22 |
| 4,707,266 | 11/1987 | Degen et al. | 210/638 |
| 4,774,132 | 9/1988 | Joffee et al. | 428/290 |
| 4,861,617 | 8/1989 | Pall et al. | 427/2 |
| 4,880,548 | 11/1989 | Pall et al. | 210/767 |
| 4,886,836 | 12/1989 | Gsell et al. | 521/53 |

FOREIGN PATENT DOCUMENTS

| | | |
|---|---|---|
| 0057065 | 8/1982 | European Pat. Off. . |
| 0091128 | 10/1983 | European Pat. Off. . |
| 3337763 | 2/1985 | Fed. Rep. of Germany . |
| 1129009 | 10/1968 | United Kingdom . |
| 1149911 | 4/1969 | United Kingdom . |
| 1274870 | 5/1972 | United Kingdom . |
| 1303897 | 1/1973 | United Kingdom . |
| 1391028 | 4/1975 | United Kingdom . |
| 1417396 | 12/1975 | United Kingdom . |
| 1486288 | 9/1977 | United Kingdom . |

*Primary Examiner*—Frank Spear
*Attorney, Agent, or Firm*—Leydig, Voit & Mayer

[57] ABSTRACT

A fluid treatment system is provided having a low affinity for amide group-containing materials comprising a porous structure, fluid-contacting components, including means to retain the porous structure, and a surface-modifying polymeric material having a low affinity for amide group-containing materials, formed in situ and bonded directly to the surfaces of the porous structure and the fluid contacting components. A method of producing a fluid treatment system having a low affinity for amide group-containing materials is also provided, comprising contacting the components of a filtration system including a porous structure and fluid contacting components, the fluid contacting components including means to retain the porous structure, with a solution of a monofunctional monomer having at least one hydroxyl group, which monomer is capable of forming a polymer having a low affinity for amide group-containing materials, and exposing the components and the monomer to ionizing radiation to effect polymerization of the monomer at the surface of the components.

27 Claims, No Drawings ns, for example filtration systems, which have a low affinity for amide group-containing materials, particularly peptide group-containing materials or proteinaceous materials.

FLUID TREATMENT SYSTEM HAVING LOW AFFINITY FOR PROTEINACEOUS MATERIALS

TECHNICAL FIELD

The present invention is directed to a fluid treatment system having low protein adsorbability. More particularly, it relates to a method for treating, such as filtering, protein-containing liquids and to filtration systems in which all fluid-contacting surfaces have a low affinity for amide group-containing materials, such as peptide group-containing materials or proteinaceous materials.

BACKGROUND ART

Filtration is a technique which is becoming increasingly important in the purification and manufacture of protein-containing materials. Many of these materials are intended for use in pharmaceutical preparations and are of high economic value. Filtration is used in many of the steps in the production of these materials. The process is also used in analytical and diagnostic determinations. Thus, in many instances filtration may be employed to separate proteins from biological fluids which also include materials such as cells, cell debris, or residues of animal or plant tissue. Filtration, and particularly ultrafiltration, can be used to separate desired proteins from other biological materials or to adjust solutions to a useful protein concentration. The technique also finds application in the final stages of producing pharmaceutical or biological preparations where sterilization of the product is accomplished by removing bacteria and other biological organisms from the preparation.

Since filtration may be conducted several times during the manufacture or purification of a protein-containing preparation, it is important that the filtration procedure result in losses of as little of the desired protein as possible from the fluid being filtered. This is especially important when the proteins sought are difficult to produce and are very costly. It is also important when filtration is the final operation performed on a bottling line in the manufacture and packaging of pharmaceuticals, where each bottle must contain a specified amount of the desired materials and little or no loss of protein during filtration can be tolerated.

While some studies of the adsorption of proteins on various surfaces have been conducted, the construction of filtration systems which have a reduced tendency to adsorb protein has been given very little attention. Most research has been directed to filtration media which have a low affinity for protein. Although the use of such media can reduce the adsorption of desired protein during a filtration process, the problem of losses of protein due to the adsorption of protein by other components of the filtration system which contact the protein-containing fluid during use has not previously been considered.

Most of the materials currently used to construct filtration systems or diagnostic devices employed in the filtration or testing of biological fluids suffer from their tendency to sorb protein-aceous materials. Although materials exist which demonstrate a low affinity for proteinaceous materials, they typically have shortcomings other than the adsorption of proteinaceous materials. Thus, some materials may be difficult to fabricate into the desired component because of difficulties in molding, machining, etc. Other materials, although easier to fabricate, may be very expensive. Still other materials which do not suffer from these problems may not be satisfactory in applications relating to the production of pharmaceutical materials. For example, such materials may not withstand sterilization or autoclaving conditions or may be incompatible with other components of the pharmaceutical preparations.

DESCRIPTION OF THE INVENTION

The present invention is directed to fluid treatment systems, for example filtration systems, which have a low affinity for amide group-containing materials, particularly peptide group-containing materials or proteinaceous materials. The present invention is also directed to the use of such filtration systems to filter fluids containing protein-aceous materials with minimal loss of a desired amide group-containing or proteinaceous material. The term "fluid treatment system", discussed either in the singular or plural herein, refers to all devices and apparatus which include a filter member and related hardware, particularly including fluid contacting components. By "filter member" is meant a member which includes a porous structure or filtration medium through which a fluid is passed to separate the fluid being filtered, typically a gas, or more commonly a liquid, from other substances insoluble in the fluid, such as solid or semi-solid substances, which are retained on or within the porous structure. The "related hardware" includes any and all components of the system other than the filter member, which contact (or are adapted to contact) a fluid, most often a liquid, being filtered or tested. At a minimum this includes a member to retain the porous structure (filter member) and may include those elements or components which conduct fluid (as, for example, with a tube) to the upstream surface and/or away from the downstream surface of the porous structure. This typically includes, but is not limited to, fittings, retaining members (such as those retaining the filter member), adaptors, support and drainage materials, endcaps, outer cages, filter cores, tubing used within the system or to provide external fluid communication to fluid sources or receivers, and housings. As used herein, the term "filter element" or "filter cartridge" refers to devices and particularly filtration systems which include a filter member, support and drainage materials (if any), endcaps, outer cages, cores, if present, and any adapters necessary. The term "filter assembly" refers to a self-contained, usually sealed, filtration system, which includes a filter element contained within a housing.

In a filtration system, the primary object and the function of the filter member is to separate or purify relatively large volumes of fluid and/or solid components of a mixture.

The present invention is directed to a fluid treatment system, all components of which that come in contact with or are adapted to come in contact with a fluid being filtered have a low affinity for amide group-containing materials, particularly peptide group-containing materials or proteinaceous materials. The fluid treatment system of the present invention exhibits lower adsorption of protein than comparable systems which include components fabricated from conventional materials and also fluid treatment systems which include a filtration member having a low affinity for proteinaceous materials but the remaining components of which are fabricated from conventional materials. In addition, the present invention is fabricated from materials which are not overly expensive, which may be autoclaved, and which are easily fabricated.

In particular, the present invention is directed to a disposable filter cartridge or capsule filter, all of whose surfaces which come in contact with liquid during use have been modified to have low affinity for proteinaceous materials. A capsule filter is a disposable filter assembly which includes as an integral unit a filter element sealed inside a housing and includes hose connections or fittings required to connect the assembly to the fluid handling system of which the filtration system is a part. In addition, the present invention may include plastic tubing or piping used to conduct liquid to and from the filter assembly.

The fluid treatment system of the present invention preferably includes (a) a filter member, i.e., porous structure, and (b) related hardware, including all fluid-contacting components of the fluid treatment system other than the filter member which contact, or are adapted to contact, a fluid being filtered. Both (a) and (b) are formed, preferably, from materials, particularly polymeric materials, which have undergone graft polymerization with monomeric materials, to provide their surfaces with a low affinity for amide group-containing materials. As a result of such graft polymerization, the components are bonded at their surfaces directly to a surface-modifying polymeric material having a low affinity for amide group-containing materials, particularly peptide group-containing or proteinaceous materials, the surface-modifying polymeric material being rich in hydroxyl groups. The monomer from which the surface-modifying polymeric material is derived is one or more monofunctional monomers having at least one hydroxyl group, preferably a vinylic or ethylenically unsaturated hydroxyl-containing monomer. The surface-modifying material is preferably rich in hydroxyl groups. The hydroxyl groups of the surface-modifying polymeric material provide a low affinity for amide group-containing materials. In addition, the hydroxyl rich surface imparts hydrophilicity when applied to a hydrophobic substrate.

The surface-modifying polymeric material is formed on and grafted to the surface of all components which contact or are expected to contact fluid being treated during the intended use of the system, such as components (a) and (b), by contacting each of the components separately or the assembled fluid treatment system with one or more suitable hydroxyl-containing monomer and thereafter exposing the substrate to ionizing radiation, such as short wave ultraviolet radiation or, preferably, gamma radiation. This results in polymerization of the monomer and grafting to the substrates which form components of the filtration system.

BEST MODE FOR CARRYING OUT THE INVENTION

The present invention is directed to a fluid treatment system and most particularly to a filtration system in which the surfaces of all components that contact or are adapted to contact a fluid, particularly a liquid, such as a liquid containing a proteinaceous material that is being filtered and/or tested, have a low affinity for amide group-containing materials, such as peptide group-containing materials or proteinaceous materials. Preferably the filtration system includes (a) a filter member and (b) all components of the fluid treatment system which contact or are adapted to contact a liquid in the assembled system other than the filter member. In the simplest embodiment of a filtration system according to the present invention, component (b) may take the form of a tube having parallel sides or walls or a tapered tube, as for example a conical tube, such as in a filter funnel. The device would have a means for retaining a filter member and the walls of the device are arranged to conduct fluid to the upstream surface of the filter member and possibly away from the downstream surface of the filter member. In other embodiments the filtration system may be in the form of a disposable filter element, a filter element installed in a housing, or a capsule filter. In these embodiments, components may include appropriate hardware, such as retaining members, end-caps, central core, and outer cage, and any support and drainage materials as well as a housing, suitable seals, fittings, and tubing or piping connecting the filtration system to the rest of the fluid handling system of which the device is a part.

Each of the components may be formed from a suitable material, preferably a polymeric material, which has been modified at its surface with a polymeric material that is rich in hydroxyl groups to provide a surface having a low affinity for amide group-containing materials, particularly peptide group-containing or proteinaceous materials. Materials which are suitable for use as the components of the present invention, either as the filtration member (porous structure) or as the other fluid-contacting components, include those materials, preferably polymeric materials, which are capable of forming radical species at their surfaces and are not adversely affected when exposed to ionizing radiation. In addition, such materials should not react adversely with solvents employed in the monomer solution used to modify the surface of the component, the monomers themselves, nor the surface modifying materials. Such materials as well as the surface-modifying materials should also withstand autoclaving or sterilization conditions. When employed as the hardware components, i.e., those components other than the filter element, the materials are typically moldable thermoplastic or machinable polymeric materials of the type commonly used in the manufacture of disposable filters and filter assemblies. Materials which are suitable for use for all components of the invention are polymeric materials capable of radical formation under the influence of ionizing radiation. Examples of such materials include polyamides (such as nylons), polysulfones, polyolefins (such as polyethylene and polypropylene), fluorinated polymers (such as polyvinylidene difluoride, perfluoroalkoxy resins (PFA), and ethylene chlorotrifluoroethylene copolymers), polyesters (such as polyethylene terephthalate and polybutylene terephthalate) and acetal-based polymers. Materials preferred for use as a filter member are polyamides, polysulfones, polyolefins, polyesters, cellulose esters, and polyvinylidene difluoride. Those materials preferred for use as components of the fluid treatment system other than the porous structure include polysulfones, polyesters, polyamides, polyvinylidene difluoride, and polyolefins, particularly polyethylene and polypropylene.

Particularly preferred for use as the filter members in the present invention are polyamides, such as the nylons, among which the preferred nylons include polyhexamethylene adipamide, poly-ε-caprolactam, polymethylene sebacamide, poly-7-aminoheptanoamide, or polyhexamethylene azeleamide, with polyhexamethylene adipamide (nylon 66) being most preferred.

Materials which are most preferred for use as components other than the porous structure or filter member of the present invention are polypropylene, polyesters, and polyamides of the type discussed immediately above.

When a porous structure is employed as a filter, specifically in a filtration system, such members are typically characterized by absolute pore ratings (pore diameters) in the range of about 0.01 to about 100 microns, preferably about 0.05 to about 30 microns.

The surface-modifying polymeric material, which has a low affinity for proteinaceous materials, may be any polymeric material which may be formed in situ on the surfaces of components from a monofunctional unsaturated monomer rich in hydroxyl groups or groups capable of reacting to form hydroxyl groups, particularly after or upon formation of the surface-modifying polymeric material, and which is capable of undergoing polymerization and bonding to the substrate under the influence of ionizing radiation. Terms such as "monofunctional", "functional groups", and "functionality", as used herein in describing the reactive groups of the monomers suitable for use in the present invention, refer to those functional groups which are believed to be responsible for polymerization and bonding to the polymeric substrate or component surface.

The affinity of the surface-modified polymeric substrate for peptide group-containing or protein-aceous materials is much lower than that of the polymeric substrate from which the medium is formed.

The term "proteinaceous materials", as used herein, includes proteins, peptides, and amino acids and may include substances with sterically accessible amide moieties or substances in which the proportion of amide moieties to other moieties is high. Terms such as "surface", "substrate surface", "component surface", or like terms used in the singular or plural, are intended herein to include all surfaces of the fluid treatment system of the present invention which contact fluids in use. These include not only the gross surfaces, that is, the external surfaces, such as those which are exposed to view in either the assembled or unassembled state, but also the internal surfaces or those surfaces which define internal surfaces not open to view, such as the hollow portion of a filter core, the interstices which exist within or between components, or pores of the medium from which the filter member is formed.

The fluid treatment systems of the present invention may be constructed from individual components, each of which have been separately modified by grafting to the surfaces thereof a polymeric material having a low affinity for amide group-containing materials. This may be accomplished by immersing each of the components in a solution of a suitable monomer which may be polymerized and grafted to the surface of the component to thereby provide the component with a low affinity for amide group-containing materials.

In a similar manner, and particularly with filtration systems, an assembled filter element or filter assembly may be immersed in the monomer solution so as to contact with the solution of monomer all of the internal surfaces of the assembled unit which contact or are adapted to contact, during use, a fluid being treated, particularly a liquid to be filtered. The components or assembled filter unit may then be suitably irradiated to effect polymerization and grafting. Gamma radiation is preferred although in some instances ultraviolet radiation may be employed for irradiation of individual components when all of the liquid contacting surfaces of the components are exposed to the radiation.

Any known means for effecting contact, polymerization, and grafting to provide surface modification may be employed in the present invention. However, a particularly effective means for achieving this objective is described in U.S. patent application Ser. No. 06/945,569 of Thomas Gsell, filed Dec. 23, 1986 and U.S. Pat. No. 4,888,836 to Thomas Gsell et al., filed June 3, 1987, which are specifically incorporated herein by reference.

The preparation of a filtration system having a low affinity for amide group-containing materials, a preferred embodiment of the present invention, is described herein. The method of preparation is exemplary of the method of preparation of fluid treatment systems generally. To prepare the filtration system of the present invention, the components may be contacted in either their unassembled or assembled state with the solution of surface-modifying monomeric material. Thus, a filter member, appropriate hardware, such as endcaps, central core, filter member retaining means, and outer cage, and, optionally, support and drainage materials, may be individually immersed in a solution containing a surface-modifying monomer to be polymerized and grafted to the surface of the components of the filtration system, preferably a hydroxyl group-containing monomer. The filter housing in which the filter element resides during use in filtration, may be filled with the surface-modifying solution and similarly exposed to gamma-radiation. Optionally, the filter element may also be sealed inside a housing thereby integrally forming a filter assembly which is then filled with surface-modifying solution and exposed to gamma-radiation. Alternatively, a filter element may be installed in its housing or a filter assembly in which a filter element is integrally sealed within the housing may be filled with surface-modifying solution and exposed to gamma-radiation. The method of filling such filtration systems depends on their structures but typically may be accomplished by simply immersing the filter element or assembly in monomer solution, causing the solution to flow through the system or a combination of both methods. Regardless of the method of contacting the filtration system with the surface-modifying solution, it is imperative that all surfaces of the system which come in contact with fluid during filtration be in contact with the surface-modifying solution during the polymerization and grafting step.

The surface-modifying polymers which are formed at the surfaces of the components that contact or are adapted to contact a fluid, particularly a liquid, during use are materials which have a low affinity for proteinaceous materials, as measured by the Bovine Serum Albumen Test. Such surface-modifying materials include polymeric materials which may be formed in situ on and bonded directly to the surface of the substrate by graft polymerization. These surface-modifying polymeric materials are characterized by their low affinity for amide group-containing materials, such as proteinaceous materials, and by having a surface rich in hydroxyl groups.

The preferred polymeric material which forms the modified surface of the medium is derived from monomers having moieties characterized by ethylenic or vinylic unsaturation and hydroxyl groups. However, preferred compounds may additionally include other groups, such as carboxyl moieties (i.e., $-CO_2-$, as in the ester linkage), hydroxyl or hydroxyl-forming substituted acrylate esters being exemplary. Also preferred are mono-acrylate and mono-methacrylate esters of polyethylene and polypropylene glycols. Particularly preferred as monomers are hydroxyalkyl acrylates and methacrylates in which the hydroxyalkyl group constitutes a hydroxyl-substituted lower alkyl group having from 2 to 5 carbon atoms, preferably from 2 to 3 carbon atoms. Although the preferred substituent is a hydroxyl group, a substituent capable of reacting to form a hydroxyl group may be present. Mixtures of monomers may also be used.

Exemplary of preferred monomers are such compounds as 2-hydroxyethyl acrylate, 2-hydroxyethyl methacrylate, 2-hydroxyprop-1-yl acrylate, 1-hydroxyprop-2-yl acrylate, 2-hydroxyprop-1-yl methacrylate, 1-hydroxyprop-2-yl methacrylate, 3-hydroxypropyl acrylate, and 3-hydroxypropyl methacrylate. The compounds 2-hydroxyethyl acrylate and 2-hydroxyethyl methacrylate are available commercially from Rohm and Haas Chemical Company under the trademark ROCRYL and are designated ROCRYL 410 and ROCRYL 400, respectively. Mixtures of 2-hydroxyprop-1-yl acrylate and 1-hydroxyprop-2-yl acrylate are available commercially as ROCRYL 430 from Rohm and Haas Chemical Company and as product no. AM438 from Rohm Tech, Inc. A mixture of 2-hydroxyprop-1-yl and 1-hydroxyprop-2-yl methacrylates is available commercially as ROCRYL 420.

In addition to the structural features designated above, suitable monomers may be further characterized by their properties, such as interaction with ionizing radiation to form a free radical. Suitable monomeric compounds should also be substantially completely, if not totally, soluble in the solvent systems employed. The solvent should maximize solubility, not adversely affect the polymeric substrate nor the monomer employed, while permitting a satisfactory polymerization. Preferred solvents include polar solvents, particularly hydroxyl-containing solvents such as water, lower aliphatic alcohols, such as ethanol, and mixtures thereof.

Solutions of the monomer compound are used in amounts sufficient to provide low affinity for peptide group-containing materials but, when treating the porous structure, without blocking the pores of the medium. Typically the amounts used in the present invention range in concentration of the monomer(s) from about 0.1 to about 5.0 percent, by weight, preferably about 0.2 to about 3.0 percent, by weight, based on the total weight of solution. The concentration of the surface-modifying polymeric material and, therefore, the concentration of the monomer used to form the surface-modifying polymeric material is selected so as to provide the components with a substantially reduced affinity for proteinaceous materials. However, a concentration sufficiently high to result in "plugging" of the structure so as to adversely affect the flow properties of the porous structure is undesirable.

Polymerization and grafting of the monomer may be accomplished using ionizing irradiation with such sources as U.V. light or a cobalt 60 source, preferably the latter. The particular methods employed are discussed in U.S. patent application Ser. No. 06/945,569.

As indicated above, in order to provide the surfaces of the components with a low affinity for proteinaceous materials, the surfaces of the components are initially contacted with a solution of a suitable monomer. This may be accomplished by any known method which achieves thorough contact with the surfaces, particularly saturation of imperforate surfaces and thorough impregnation of porous structures such as the filter member. Typically, this is done by immersion of the individual components in the monomer solution or, in the case of an assembled fluid treatment system, causing the monomer solution to flow through the system, such as by pumping solution through the system. When all components of the fluid treatment system are easily wetted by the monomer solution, no pretreatment is required. However, when a liquophobic, particularly hydrophobic, material is employed, it is preferable to thoroughly wet the components prior to attempting saturation or impregnation with the monomer-containing solution. If this is not done, the monomer solution may not thoroughly penetrate all of the pores of the porous structure or a layer of air may become interposed between the monomer solution and the imperforate surfaces of other components preventing surface modification. Wetting of the hydrophobic surface may be accomplished by first contacting the surface of the component with a water-miscible liquid which has a surface tension sufficiently low as to wet all the components. Such a liquid may be water containing a wetting agent or a water-miscible liquid having a lower surface tension than water, such as a lower aliphatic alcohol, particularly ethanol or a mixture of ethanol and water. In those situations in which the liquid or solution used to wet the hydrophobic substrate interferes in some manner with the grafting step, the wetting agent may be displaced from the substrate by contacting and washing the component with the solvent in which polymerization is conducted, such as water, providing that the two liquids are substantially miscible. Thereafter, the solvent-saturated, preferably water-saturated, hydrophobic component may be contacted with the monomer solution in the same manner as a hydrophilic substrate. Alternatively, the monomer solution may be prepared with a solvent system which has a surface tension sufficiently low as to wet all the components. Such a solvent system may be an aqueous system containing a water-miscible, lower surface tension solvent, such as alcohol, when such solvent does not adversely affect the grafting step.

Although the form of ionizing radiation used to accomplish grafting in the present invention may include ultraviolet radiation when all surfaces of the filter member, hardware, and housing which are to have their surfaces modified are suitably exposed to the ultraviolet radiation, gamma radiation is preferred. To assure adequate polymerization and grafting, irradiation is preferably conducted under conditions in which the surfaces of all components are in contact with the monomer solution. This may be achieved by placing the components in contact with sufficient monomer solution to assure adequate contact of the component surfaces with the monomer solution throughout irradiation. In practice, this typically involves placing the components in a container of suitable volume so that each component is totally immersed in the solution. With fluid treatment systems, such as filter assemblies, this generally involves circulating the monomer solution through the filter assembly and then temporarily blocking inlet and outlet passages such that monomer solution is trapped within the assembly. With filter elements, such as the type in which the filter member is exposed to view, but which includes internal passages, such as a central core, immersion or a combination of immersion and liquid circulation and blocking may be employed.

A suitable dosage of gamma radiation will be sufficient to effect polymerization and formation of bonds between the surfaces of the components, preferably polymeric surfaces, and the hydroxyl-containing, surface-modifying polymer but insufficient to cause the hydroxyl-containing surface-modifying material to adversely affect the flow properties of porous structures. A dosage which is sufficient is that which accomplishes polymerization and grafting but which does not create a pressure drop across the treated or modified porous structure which is noticeably greater than that of an untreated system. Suitably, a dosage of about 0.2 to about 10 megarads is employed and preferably about 0.5 to about 3 megarads is used. Typically, an exposure of from about 5,000 to about 150,000 rads per hour is used for a typical irradiation period of about 4 to about 60 hours.

After exposure to radiation for a time sufficient to effect the desired modification, the treated articles are drained to remove soluble substances and those substances not bonded to the surface of the articles. Deionized water may be employed to wash the separate components or flowing deionized water may be passed through a filter element installed in a housing or through a filter assembly after residual monomer solution has been removed therefrom. If a filter housing alone was modified, residual monomer solution may be drained from it and thereafter the housing may be agitated in deionized water and rinsed. After washing, the components, either in an assembled or unassembled state, may be dried in air at temperatures as high as about 100° C. by any means conventionally used for such purposes, such as an oven.

The fluid treatment systems of the present invention, particularly the filtration systems of the present invention, may be used in the same manner as conventional systems and devices. For example, when using a filtration system according to the present invention, a fluid, most often a liquid, containing or believed to contain an amide group-containing substance, such as a proteinaceous material, is introduced to the filtration system in the usual manner. Any solid material will be retained by the filter member and a minimal amount of proteinaceous material will be adsorbed by any of the components of the system including the filter member, assorted hardware, or housing.

BOVINE SERUM ALBUMEN (BSA) PROTEIN ADSORPTION TEST

The BSA Protein Adsorption Test is useful in determining the amount of a proteinaceous substance adsorbed by a specified material. The test is performed according to a standardized procedure which is described in detail in Example 1. In this procedure, a sample to be tested is exposed to a solution containing radioactively labelled Bovine Serum Albumen, a protein commonly used in laboratory testing, in buffered saline solution. After the material has been exposed to the protein solution, excess protein solution is rinsed from the test material using buffered saline solution alone. The amount of protein adsorbed by the sample is then determined by measuring the radioactivity residual on the test material. The amount of radioactivity on the material is proportional to the amount of protein adsorbed on the material.

The preparation of a filtration system having very low affinity for proteinaceous materials is described below in Example 1. The low affinity of this system for proteinaceous materials was demonstrated using the Bovine Serum Albumen Protein Adsorption Test. The very small amount of protein retained by this filtration system is contrasted with the higher protein adsorption of an unmodified filtration system and with the higher protein adsorption of one in which only the filter member was modified.

EXAMPLE 1

A 0.2 micron-rated filter assembly (part no. DFA4001NRP, a product available from Pall Corporation, Glen Cove, N.Y.) composed of a polyester housing containing a filter element sealed therein, the filter element formed from a cylindrical, pleated filter pack, consisting of two layers of microporous nylon 66 membrane arranged between two layers of polyester nonwoven material, serving as support and drainage layers, polyester endcaps, a polypropylene outer cage, and a polypropylene core. This filter assembly, an integral unit, was filled with a monomer solution by recirculating the solution through the filter assembly at a rate of about 1 liter/minute for about 10 minutes. The monomer solution contained 1.1%, by weight, of a commercial aqueous mixture of hydroxypropyl acrylate esters (available from Rohm Tech, product no. AM438). The filter assembly was disconnected, the inlet and outlet of the assembly were capped to prevent loss of monomer solution. The liquid-filled filter assembly was then irradiated with gamma radiation at 50 kilorads/hour for a period of 20 hours. After irradiation, the filter assembly was dried by passing deionized water through it at a rate of about 2 liters/minute for 30 minutes. The filter assembly was then drained of fluid and dried in a circulating air oven at 150° F. (65.5° C.) for about 16 hours.

The effectiveness of this treatment on reducing the amount of proteinaceous materials which are retained by the filter was demonstrated by cutting apart the filter and testing a 13-mm diameter disc cut from the pleated filter pack (composed of the filter medium and the upstream drainage and downstream support materials). The test disc was placed in a filter holder and three 5 ml portions of PBS buffer were passed through the disc at a rate of about 0.5 ml/minute using a peristaltic pump with Tygon tubing. PBS buffer is a solution which is 0.15M in NaCl and 0.01M in $NaH_2PO_4$ and adjusted to pH=7. Then the filter holder with the test disc was disconnected from the tubing. The tubing was then made passive to protein by recirculating a solution of 100 micrograms/ml of $I^{125}$-labelled Bovine Serum Albumen (BSA) in PBS buffer at 0.5 ml/minute for about 5 minutes. Then the filter holder with test disc was reattached to the tubing and 2.5 ml of the solution of labelled BSA in PBS buffer was passed through the disc at a rate of 0.5 ml/minute after which 2.5 ml of PBS buffer was passed through the disc at a rate of about 0.5 ml/minute. The disc was then removed from the filter holder, blotted with a paper towel and analyzed for the amount of radioactive protein retained, this being a measure of the total amount of protein retained. This was done by placing the test disc in a plastic tube and measuring the residual radioactivity using a LKB-Wallac Mini Gamma 1275 (Wallac Oy, Finland) gamma ray counter. By measuring the amount of radioactivity remaining on the disc, it was determined that the disc retained 3 micrograms BSA/$cm^2$.

EXAMPLE 2

An untreated DFA4001NRP filter assembly of the type treated in Example 1 was cut apart and a 13-mm diameter disc of untreated filter material, support material, and drainage material was removed and tested for its ability to adsorb BSA, in the manner described in Example 1. The unmodified materials adsorbed 158 micrograms BSA/cm$^2$.

EXAMPLE 3

The filter medium used to manufacture the filter member employed in Example 2 was modified to provide low affinity for amide group-containing materials by saturating the material using a 1.1%, by weight, aqueous solution of a commercially available mixture of hydroxypropyl acrylate esters (Rocryl ™ 430, available from Rohm and Haas and substantially the same as that available from Rohm Tech as AM438).

The filter medium, as a roll, was placed in a steel container which was then sealed and evacuated. Thereafter, the monomer solution was introduced to the container in a manner to exclude air. The container was resealed and the saturated medium was irradiated with a cobalt-60 source at 50 kilorads/hour for 20 hours. The roll of filter medium was removed from the container, washed to remove residual monomer and ungrafted polymer by allowing deionized water to circulate around the roll at a temperature of about 70° C. for about 16 hours and dried by continuously pressing the medium over a heated drum.

A composite consisting of two layers of this filter medium between the same support and drainage materials used in the filter of Example 2 was tested for its ability to retain protein. The construction of the composites and the manner in which the 13-mm diameter composites were tested were the same as in Examples 1 and 2. The composite containing ordinary support and drainage materials, but employing filter material which had low affinity for amide group-containing materials retained 14 micrograms BSA/cm$^2$.

Table 1 summarizes the results of Examples 1 to 3.

TABLE 1

| Composite of Example | BSA Adsorbed ($\mu$g/cm$^2$) | Percent of Applied BSA Adsorbed |
|---|---|---|
| 1 | 3 | 0.7 |
| 2 | 158 | 40.5 |
| 3 | 14 | 3.6 |

A comparison of Examples 1 and 2 shows a 58 fold reduction in adsorption of proteinaceous materials by a filtration system in which all surfaces of the system that come in contact with liquid have been modified to have low affinity for amide group-containing materials compared with an untreated system. By contrast, only an 11 fold reduction in adsorption was achieved when the filter material alone had low affinity for amide group-containing materials.

The results obtained in Examples 1, 2, and 3 demonstrate clearly the advantages of employing a fluid treatment system all of whose surfaces which contact or are adapted to contact a fluid during use have been modified to show low affinity for amide group-containing materials.

What is claimed:

1. A filtration system having a low affinity for amide group-containing materials, comprising:
    a porous structure;
    fluid-contacting components, including means to retain said porous structure; and
    a surface-modifying polymeric material having a low affinity for amide group-containing materials, formed in situ and bonded directly to the surfaces of said porous structure and said fluid contacting components.
2. The filtration system according to claim 1 wherein said surface-modifying polymeric material comprises a material rich in hydroxyl groups.
3. The filtration system according to claim 1 wherein at least one of said porous structure and said fluid-contacting components is formed from a material capable of forming radicals under the influence of ionizing radiation.
4. The filtration system according to claim 1 wherein at least one of said porous structure and said fluid-contacting components comprises a polyamide.
5. The filtration system according to claim 4 wherein said polyamide is nylon 66.
6. The filtration system according to claim 1 wherein said surface-modifying polymeric material is derived from a monofunctional monomer having at least one hydroxyl group.
7. The filtration system according to claim 6 wherein said monomer comprises an ethylenically unsaturated compound.
8. The filtration system according to claim 1 wherein said amide group-containing material comprises proteinaceous material.
9. The filtration system according to claim 1 wherein said amide group-containing material comprises a peptide group-containing material.
10. The filtration system according to claim 6 wherein said monomer is a hydroxyalkyl-acrylate or methacrylate.
11. The filtration system according to claim 6 wherein said monomer is 2-hydroxyethyl acrylate, 2-hydroxyethyl methacrylate, 2-hydroxyprop-1-yl acrylate, 1-hydroxyprop-2-yl acrylate, 3-hydroxypropyl acrylate, 2-hydroxyprop-1-yl methacrylate, 1-hydroxyprop-2-yl methacrylate, 3-hydroxypropyl methacrylate, or mixtures of two or more of the foregoing.
12. The filtration system according to claim 6 wherein said monomer is 2-hydroxyprop-1-yl acrylate, 1-hydroxyprop-2-yl acrylate or mixtures thereof.
13. The filtration system according to claim 1 wherein said fluid contacting components include at least one of a porous structure support material, a porous structure drainage material, an endcap, an outer cage, a central core, adaptors, tubing, fittings, and a housing.
14. The filtration system according to claim 1 wherein said porous structure is a filter member.
15. A filter assembly having a low affinity for amide group-containing materials, comprising:
    (a) a housing formed from a polysulfone, polyester, polyolefin, polyvinylidene difluoride, or a polyamide;
    (b) a disposable filter cartridge;
    (c) fluid-contacting fittings; and
    (d) a surface-modifying polymeric material having a low affinity for amide group-containing materials, formed in situ and bonded directly to the surfaces of components (a), (b), and (c).

16. A method of producing a filtration system having a low affinity for amide group-containing materials, comprising:

contacting the components of a filtration system comprising a porous structure and fluid contacting components, said fluid contacting components including means to retain said porous structure, with a solution of a monofunctional monomer having at least one hydroxyl group, which monomer is capable of forming a polymer having a low affinity for amide group-containing materials; and exposing said components and said monomer to ionizing radiation to effect polymerization of said monomer at the surface of said components and bonding to the surface of said components.

17. The method of producing a filtration system having a low affinity for amide group-containing materials according to claim 16 wherein at least one of said porous structure and said fluid contacting components comprises a material capable of forming radicals under the influence of ionizing radiation.

18. The method of producing a filtration system having a low affinity for amide group-containing materials according to claim 16 wherein at least one of said porous structure and said fluid contacting components comprises a polyamide.

19. The method of producing a filtration system having a low affinity for amide group-containing materials according to claim 16 wherein at least one of said porous structure and said fluid contacting components is nylon 66.

20. The method of producing a filtration system having a low affinity for amide group-containing materials according to claim 16 wherein said polymer formed from said monomer is rich in hydroxyl groups.

21. The method of producing a filtration system having a low affinity for amide group-containing materials according to claim 16 wherein said components of said filtration system are individually contacted with said monomer solution.

22. The method of producing a filtration system having a low affinity for amide group-containing materials according to claim 16 wherein said components of said filtration system are contacted with said monomer solution in an assembled state.

23. A method of filtering a fluid containing a proteinaceous material with a minimal loss of the proteinaceous material, comprising:

introducing a fluid containing a proteinaceous material to a filtration system having a low affinity for amide group-containing materials, which filtration system comprises
 (a) a porous structure,
 (b) fluid contacting components including means to retain said porous structure, and
 (c) a surface-modifying polymeric material having a low affinity for amide group-containing materials formed in situ and bonded directly to the surface of said porous structure and said fluid contacting components; and passing said fluid through said porous structure.

24. A fluid treatment system having a low affinity for amide group-containing materials, comprising:
 (a) a porous structure;
 (b) fluid contacting components, including means to retain said porous structure; and
 (c) a surface-modifying polymeric material having a low affinity for amide group-containing materials formed in situ and bonded directly to the surfaces of said porous structure and said fluid contacting components.

25. The method of producing a filtration system having a low affinity for amide group-containing materials according to claims 16 wherein said monomer is a hydroxyalkyl acrylate or methacrylate.

26. The method of producing a filtration system having a low affinity for amide group-containing materials according to claim 16 wherein said monomer is 2-hydroxyethyl acrylate, 2-hydroxyethyl methacrylate, 2-hydroxyprop-1-yl acrylate, 1-hydroxyprop-2-yl acrylate, 3-hydroxypropyl acrylate, 2-hydroxyprop-1-yl methacrylate, 1-hydroxyprop-2-yl methacrylate, 3-hydroxypropyl methacrylate, or mixtures of two or more of the foregoing.

27. The method of producing a filtration system having a low affinity for amide group-containing materials according to claim 16 wherein said monomer is 2-hydroxyprop-1-yl acrylate, 1-hydroxyprop-2-yl acrylate or mixtures thereof.

* * * * *